United States Patent
Lin et al.

(10) Patent No.: US 7,865,911 B2
(45) Date of Patent: Jan. 4, 2011

(54) HYBRID PROGRAMMING

(75) Inventors: Shiding Lin, Beijing (CN); Zhenyu Guo, Beijing (CN); Zheng Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1206 days.

(21) Appl. No.: 11/269,149

(22) Filed: Nov. 8, 2005

(65) Prior Publication Data

US 2007/0106997 A1    May 10, 2007

(51) Int. Cl.
    *G06F 9/38*    (2006.01)
(52) U.S. Cl. ..................................... 719/328; 717/119
(58) Field of Classification Search .................. 719/328
    See application file for complete search history.

(56) References Cited

U.S. PATENT DOCUMENTS 5,999,729 A * 12/1999 Tabloski et al. ............. 717/105
6,122,277 A * 9/2000 Garmire et al. ............. 370/390
2001/0042138 A1* 11/2001 Buendgen .................... 709/310
2005/0125508 A1* 6/2005 Smith et al. ................. 709/220

* cited by examiner

*Primary Examiner*—H. S. Sough
*Assistant Examiner*—Syed Roni
(74) *Attorney, Agent, or Firm*—Lee & Hayes, PLLC (57) ABSTRACT

Hybrid programming combines certain aspects of the synchronous calling nature of a thread-oriented programming model with certain aspects of the asynchronous calling nature of an event-oriented programming model by creating parallelized calls. In a described implementation, multiple synchronous calls are transformed into multiple asynchronous calls and encapsulated within a barrier time period. A hybrid programming model or protocol may be employed, for example, in conjunction with communication exchanges in a multiple-phase and multiple-party distributed programming environment.

19 Claims, 6 Drawing Sheets

HYBRID PROGRAMMING

BACKGROUND

The creation of software often starts with an unfulfilled need that can be met by the operations of an electronic apparatus. The unfulfilled need provides direction for a software programmer to begin planning an outline of logic that can achieve the goal of meeting the unfulfilled need. The software programmer is responsible for providing finalized code that is both executable on an electronic apparatus and capable of achieving the goal.

Some software development systems facilitate the production of finalized executable code from higher-level logical outlines. By way of example only, a software development system may permit a programmer to input a logic outline using a graphical user interface (GUI). The logical components that are input by way of the GUI can then be transformed by the software development system into skeleton code. The programmer is then empowered to expand the skeleton code into complete source code. The source code can be transformed into finalized executable code using a compiler or similar development tool.

SUMMARY

Hybrid programming combines certain aspects of the synchronous calling nature of a thread-oriented programming model with certain aspects of the asynchronous calling nature of an event-oriented programming model by creating parallelized calls. In a described implementation, multiple synchronous calls are transformed into multiple asynchronous calls and encapsulated within a barrier time period. A hybrid programming model or protocol may be employed, for example, in conjunction with communication exchanges in a multiple-phase and multiple-party distributed programming environment. In another described implementation, multiple first synchronous message calls are parallelized. If affirmative acknowledgments are received for each of the multiple first synchronous message calls within a predetermined barrier time period, then multiple second synchronous message calls are parallelized. If affirmative acknowledgments are received for each of the multiple second synchronous message calls within a predetermined barrier time period, then the program can proceed. If, on the other hand, an affirmative acknowledgment fails to be received, then the failure issue is handled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Two programming models are the thread programming model and the event programming model. The thread model is a blocking model that relies on synchronous calls. In contrast, the event model is a non-blocking model that relies on asynchronous calls. Both models can be employed when programming in a distributed environment such as a peer-to-peer (P2P) network. Each model has benefits and drawbacks.

With synchronous calls being used with the thread model, writing code in a thread programming model environment is relatively easier. There are generally fewer simultaneous processes occurring that need to be tracked and managed. Unfortunately, it is difficult for one peer to communicate with multiple other peers in a timely manner because the blocking that is instituted in thread modeled programming frequently causes significant communication delays.

With asynchronous calls being used with the event programming model, communications between one peer and multiple other peers is expedited inasmuch as they may be occurring simultaneously. Unfortunately, writing code in an event programming model environment is relatively more difficult because many different processes may be occurring simultaneously. A program written in accordance with an event model may entail multiple phases with a number of callbacks to connect different parts of the program.

Thus, both the thread programming model and the event programming model have benefits and drawbacks, especially in a distributed system that involves many communications between and among different devices. In an implementation described herein, a hybrid programming model combines some aspects of a thread-oriented programming model and some aspects of an event-oriented programming model.

Figure 1:
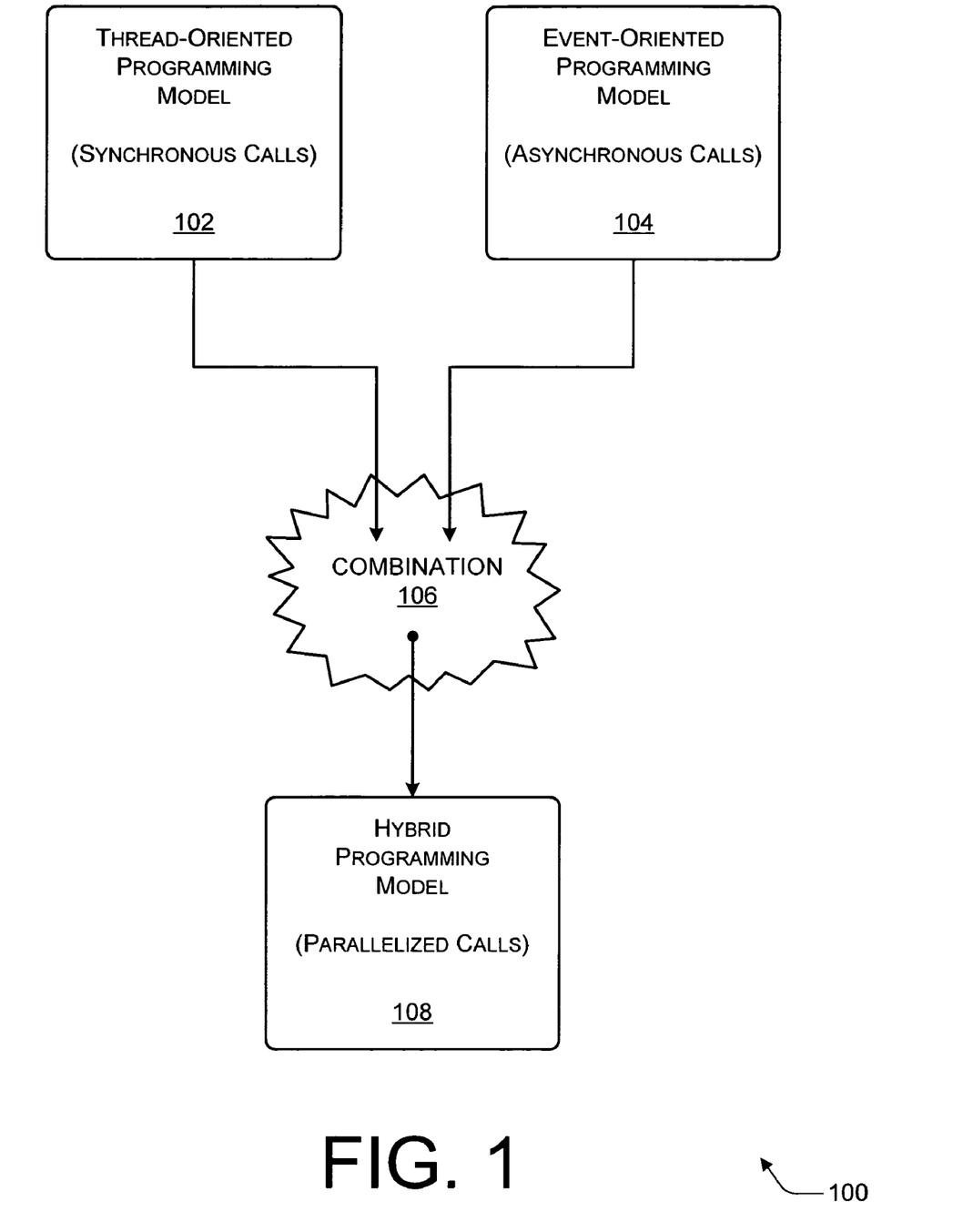
FIG. 1 is a block diagram illustrating an example selective combination of two programming models to create a hybrid programming model.

FIG. 1 is a block diagram 100 illustrating an example selective combination 106 of two programming models 102 and 104 to create a hybrid programming model 108. As illustrated, block diagram 100 includes three (3) programming model blocks 102, 104, and 108. A combination operation 106 is also illustrated.

In a described implementation, thread-oriented programming model 102 is associated with synchronous calls, and event-oriented programming model 104 is associated with asynchronous calls. Thread-oriented programming model 102 and event-oriented programming model 104 are selectively combined in a combination operation 106 to produce hybrid programming model 108. Hybrid programming model 108 is associated with parallelized calls.

Parallelized calls may involve simultaneously or asynchronously executing multiple synchronous calls of a set of synchronous calls that are encapsulated into a single overall synchronous-like grouping. The nature of parallelized calls, as well as a programming model aspects resulting from combination operation 106, are described further herein below.

Figure 2:
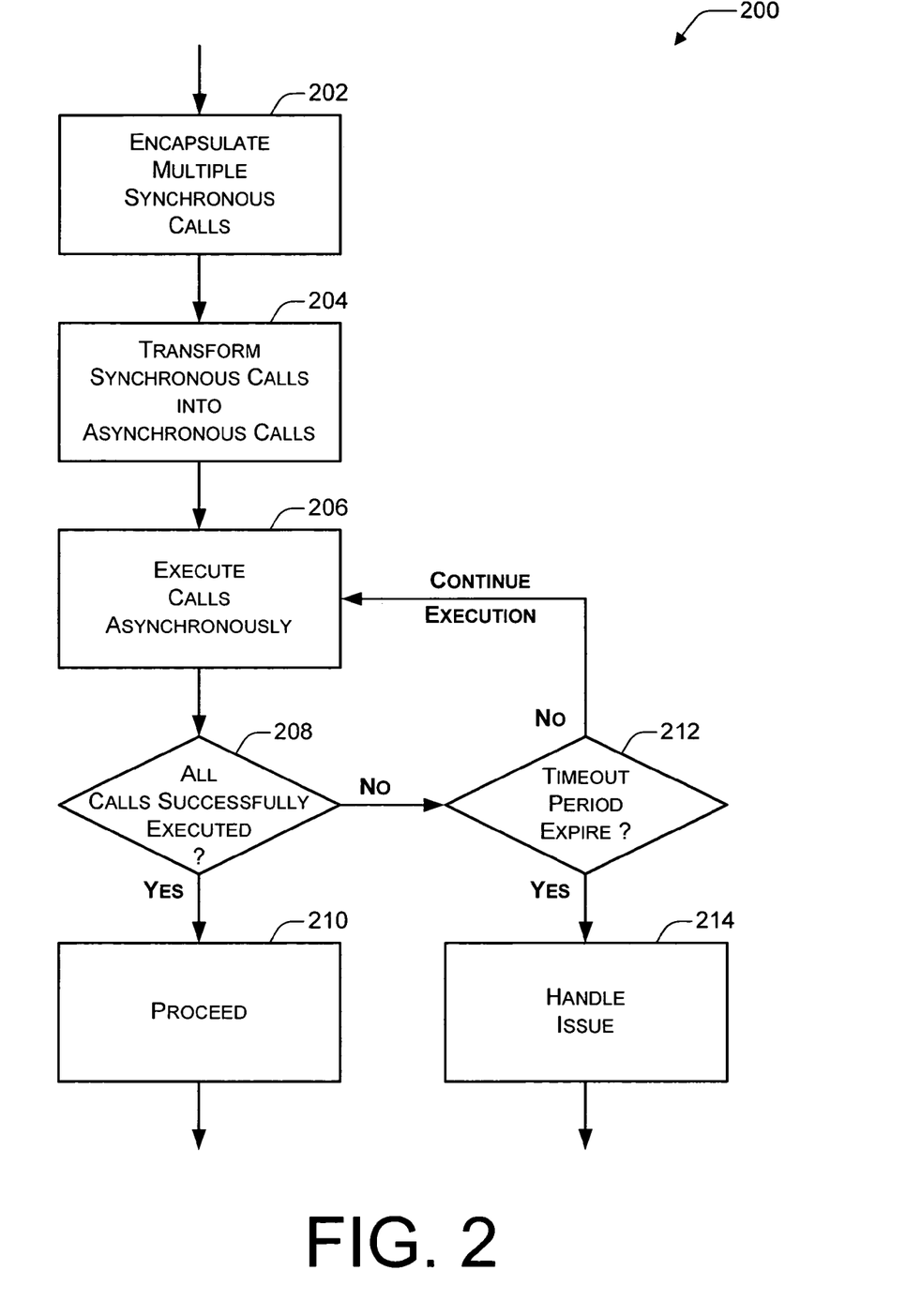
FIG. 2 is a flow diagram that illustrates a first example of a method for hybrid programming.

FIG. 2 is a flow diagram 200 that illustrates a first example of a method for hybrid programming. Flow diagram 200 includes seven (7) blocks 202-214. Although the actions of flow diagram 200 may be performed in other environments and with a variety of hardware and software combinations, a device 302 that is described herein below with particular reference to FIG. 3 may be used to implement the method of flow diagram 200. Also, the method may be implemented in a distributed programming or networked environment.

At block 202, multiple synchronous calls are encapsulated. For example, a set of synchronous calls may be grouped together. At block 204, the encapsulated synchronous calls are transformed into asynchronous calls. For example, each synchronous call from the grouping may be transformed into an asynchronous call, with the asynchronous calls capable of being executed in parallel (e.g., with one or more calls being started while one or more other calls are still incomplete).

At block 206, the transformed calls are executed asynchronously. For example, execution of some of the transformed calls of the grouping may at least partially overlap with execution of other ones of the transformed calls of the grouping (e.g., be executed substantially in parallel). At block 208, it is determined if all calls were successfully executed. For example, it may be determined if all encapsulated calls of the grouping have been successfully executed. If so, then at block 210 the program proceeds to another phase, algorithm, or program portion.

If, on the other hand, all calls have not been successfully executed (as determined at block 208), then at block 212 it is determined if a timeout period has expired. If not, then execution of the encapsulated calls continues at block 206. If the timeout period has expired, then at block 214 the issue is handled. For example, the non-completion of the encapsulated synchronous calls may be addressed in some predetermined manner.

Figure 3:
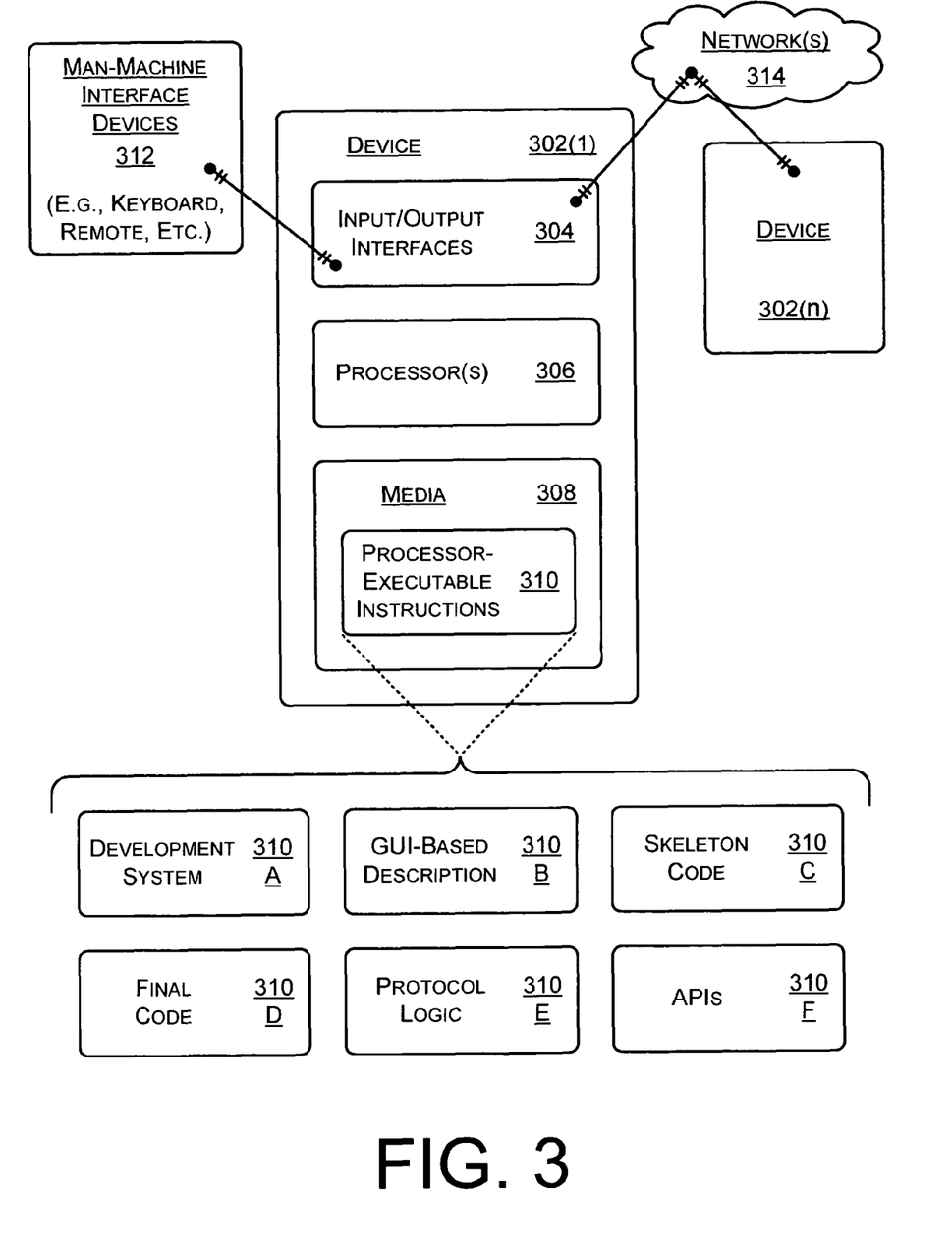
FIG. 3 is a block diagram of an example device that may be employed in conjunction with hybrid programming.

FIG. 3 is a block diagram of an example device 302 that may be employed in conjunction with hybrid programming. For example, device 302 may be used during the development of a program and/or protocol that uses hybrid programming, be used to execute or employ a program and/or protocol that uses hybrid programming, and so forth. Device 302 may, for instance, perform the actions of flow diagram 200 (of FIG. 2).

In a described implementation, multiple devices 302 (or network nodes) are capable of communicating across one or more networks 314. As illustrated, two devices 302(1) and 302(n) are capable of engaging in communication exchanges via network 314. Although two devices 302 are specifically shown, one or more than two devices 302 may be employed, depending on implementation.

In one example implementation, one device 302 (e.g., device 302(1)) is being used to develop a program and/or protocol. In another example implementation, many devices 302 are present on network 314. Each device 302 is considered a peer in a peer-to-peer (P2P) network with one device (e.g., device 302(1)) being a coordinator in a given communication exchange and other devices (e.g., devices 302(2 . . . n)) being subordinates in the given communication exchange.

Generally, device 302 may represent a server device; a storage device; a workstation or other general computer device; a router, switch, or other transmission device; a so-called peer in a distributed P2P network; some combination thereof; and so forth. As illustrated, device 302 includes one or more input/output (I/O) interfaces 304, at least one processor 306, and one or more media 308. Media 308 include processor-executable instructions 310. Although not specifically illustrated, device 302 may also include other components.

In a described implementation of device 302, I/O interfaces 304 may include (i) a network interface for communicating across network(s) 314, (ii) a display device interface for displaying information on a display screen, (iii) one or more man-machine interfaces, and so forth. Examples of (i) network interfaces include a network card, a modem, one or more ports, and so forth. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 312 (e.g., a keyboard, a mouse or other graphical pointing device, etc.).

Generally, processor 306 is capable of executing, performing, and/or otherwise effectuating processor-executable instructions, such as processor-executable instructions 310. Media 308 is comprised of one or more processor-accessible media. In other words, media 308 may include processor-executable instructions 310 that are executable by processor 306 to effectuate the performance of functions by device 302.

Thus, realizations for hybrid programming may be described in the general context of processor-executable instructions. Generally, processor-executable instructions include routines, programs, applications, coding, modules, protocols, objects, interfaces, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 306 may be implemented using any applicable processing-capable technology. Media 308 may be any available media that is included as part of and/or accessible by device 302. It includes volatile and non-volatile media, removable and non-removable media, and storage and transmission media (e.g., wireless or wired communication channels). For example, media 308 may include an array of disks for longer-term mass storage of processor-executable instructions 310, random access memory (RAM) for shorter-term storage of instructions that are currently being executed, link (s) on network 314 for transmitting communications, and so forth.

As specifically illustrated, media 308 comprises at least processor-executable instructions 310. Generally, processor-executable instructions 310, when executed by processor 306, enable device 302 to perform the various functions described herein, including those actions that are illustrated in flow diagrams 200 and 500 (of FIGS. 2 and 5, respectively) and those protocols that are illustrated in block diagrams 400 and 600 (of FIGS. 4 and 6, respectively).

By way of example only, processor-executable instructions 310 may include all or part of a development system 310A, a GUI-based programming description 310B, skeleton code 310C, final code 310D, protocol logic 310E, and APIs 310F. Generally, each may be considered a programming construct.

In a described implementation, development system 310A facilitates the creation of software programs. A programmer may use development system 310A to display a logical outline as a GUI-based description 310B. Development system 310A is capable of producing skeleton code 310C from GUI-based description 310B. After the programmer expands (e.g., fine tunes and adds details to) skeleton code 310C, final code 310D results. This final code 310D comprises final source code. After compiling, final code 310D comprises final executable or object code.

Devices 302 communicate with each other over network 314 using some protocol. The processor-executable instructions 310 that implement, enforce, or otherwise comport with this protocol comprise protocol logic 310E. The interfaces that enable access to hybrid programming features, objects, etc. comprise APIs 310F. An example API 310F is the parallelize ("PAR") API that is described herein below.

Any of these programming constructs may comprise a hybrid programming implementation. For example, development system 310A may implement the actions of flow diagrams 300 or 500 by producing appropriate code in accordance with a hybrid programming model. For instance, development system 310A may act as a parallelizer of synchronous calls, possibly in a manner that is transparent to a programmer. GUI-based description 310B may represent and skeleton/final code 310C/310D may realize such actions. Protocol logic 310E and APIs 310F may implement the hybrid programming protocols illustrated in FIGS. 4 and 6.

Figure 4:
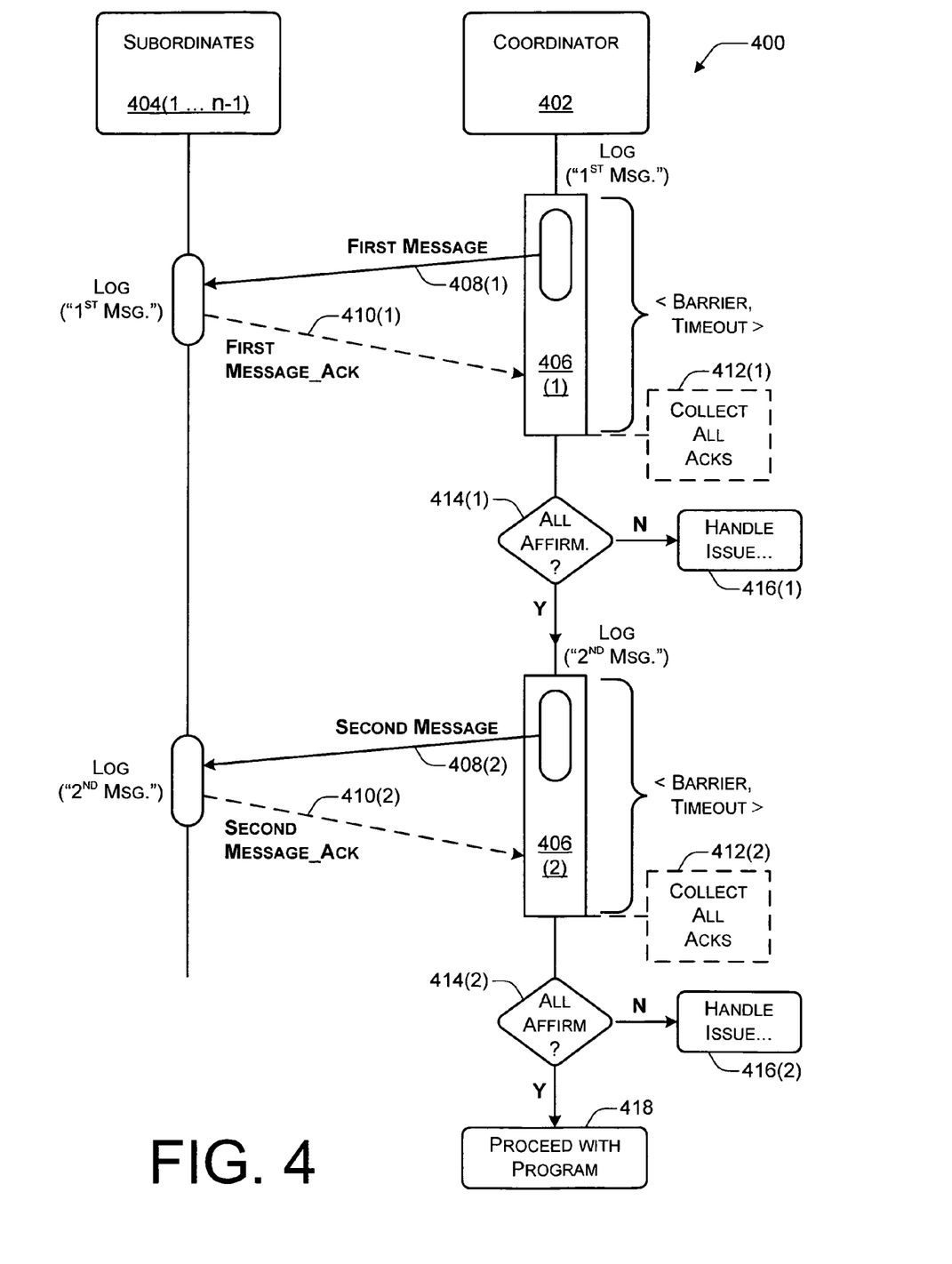
FIG. 4 is a general example of a hybrid protocol for hybrid programming.

FIG. 4 is a general example of a hybrid protocol 400 for hybrid programming. Hybrid protocol 400 is applicable, for example, to a multiple-phase and multiple-party communication exchange. As illustrated, there are two phases and "n" parties, such as "n" peers. However, communication exchanges with fewer or more than two phases may alternatively adopt hybrid protocol 400. One coordinator 402 is involved in (n–1) communication exchanges with (n–1) subordinates 404(1 . . . n–1).

In a described implementation generally, the first phase corresponds to first messages 408(1) and first message acknowledgments 410(1). The second phase corresponds to second messages 408(2) and second message acknowledgments 410(2). Each set of messages is encapsulated within a barrier 406. The received acknowledgments are collected at block 412, and they are accounted for at decision block 414.

Specifically, the first message is logged at coordinator 402. A first barrier 406(1) is instituted to encapsulate the set of first messages corresponding to the first communication exchange. The barrier includes a "timeout" variable. First messages 408(1) are sent from coordinator 402 to subordinates 404(1 . . . n–1). Subordinates 404(1 . . . n–1) also log the first message. Zero to n–1 of subordinates 404(1 . . . n–1) send a first message_ack 410(1) back to coordinator 402.

Coordinator 402 receives none to all of the first message_acks 410(1) that are sent from subordinates 404(1 . . . n–1) within or during barrier 406(1). The length of the encapsulating barrier 406(1) is set by the timeout variable. When the timeout period expires, all acknowledgment messages (i.e., all first message_acks 410(1)) are collected at block 412(1).

At block 414(1), coordinator 402 determines if all first messages 408(1) have been affirmatively acknowledged by all destination subordinates 404(1 . . . n–1). If coordinator 402 fails to receive an acknowledgment from one or more subordinates 404(1 . . . n–1) or if a received acknowledgment is a negative acknowledgement, then coordinator 402 attempts to handle the issue at block 416(1). The issue may be handled, for example, by investigating the status of non-responding subordinates 404, by resending first messages 408(1) to non-responding subordinates 404, by attempting a different procedure, by aborting the current procedure, some combination thereof, and so forth.

If, on the other hand, coordinator 402 does receive an affirmative acknowledgment from all destination subordinates 404(1 . . . n–1) (as determined at block 414(1)), coordinator 402 may proceed with the next phase. As illustrated in FIG. 4, hybrid protocol 400 includes a second phase. In the second phase, the second message is logged at coordinator 402. A barrier 406(2) is instituted to encapsulate the second messages. A total of (n–1) second messages 408(2) are sent to subordinates 404(1 . . . n–1), which log the second messages upon receipt. From zero to all of subordinates 404(1 . . . n–1) return a second message_ack 410(2) to coordinator 402.

Collection of received second message_acks 410(2) ceases at the conclusion of barrier 406(2) as established by the timeout variable. All of the received second message acknowledgments 410(2) are collected at block 412(2). At block 414(2), coordinator 402 determines if all of the second messages have been affirmatively acknowledged. If not, the issue is handled at block 416(2). If all of the second messages have been affirmatively acknowledged, coordinator 402 may proceed with the next program portion at block 418. The next part of the program that is conducted may be another encapsulated message phase, another operation (including one prepped by the first two message phases), and so forth.

In a described implementation, first and second messages 408 are synchronous messages. However, the institution of barrier 406 enables the encapsulated messages 408 to be transformed into asynchronous messages within barrier 406. However, the set of transformed messages remain synchronous with respect to the remainder of the program coding. In other words, from a macro scale, the set of messages remain synchronous to facilitate easier coding, but each individual synchronous message within the set of messages is transformed into an asynchronous message to expedite communication exchanges.

The transformation may be accomplished in a fashion that is transparent to the programmer. The following sample code represents an example communication exchange that comports with a hybrid programming model. The set of synchronous messages are parallelized with a "PAR" command having a "PAR_BEGIN" and a "PAR_END".

```
LOG("FirstMessage");
PAR_BEGIN(Timeout)
    for_each(p, SubodinateSet) {
        SendMsg(p, FIRSTMESSAGE, AckBuf[p]);
    }
PAR_END
if (all_affirm_ack) {
    LOG("SecondMessage");
    PAR_BEGIN(Timeout)
        for_each(p, SubodinateSet) {
            SendMsg(p, SECONDMESSAGE, AckBuf[p]);
        }
    PAR_END
}
```

The "PAR_BEGIN" and "PAR_END" commands may be inserted for a programmer by, for example, development system 310A.

Figure 5:
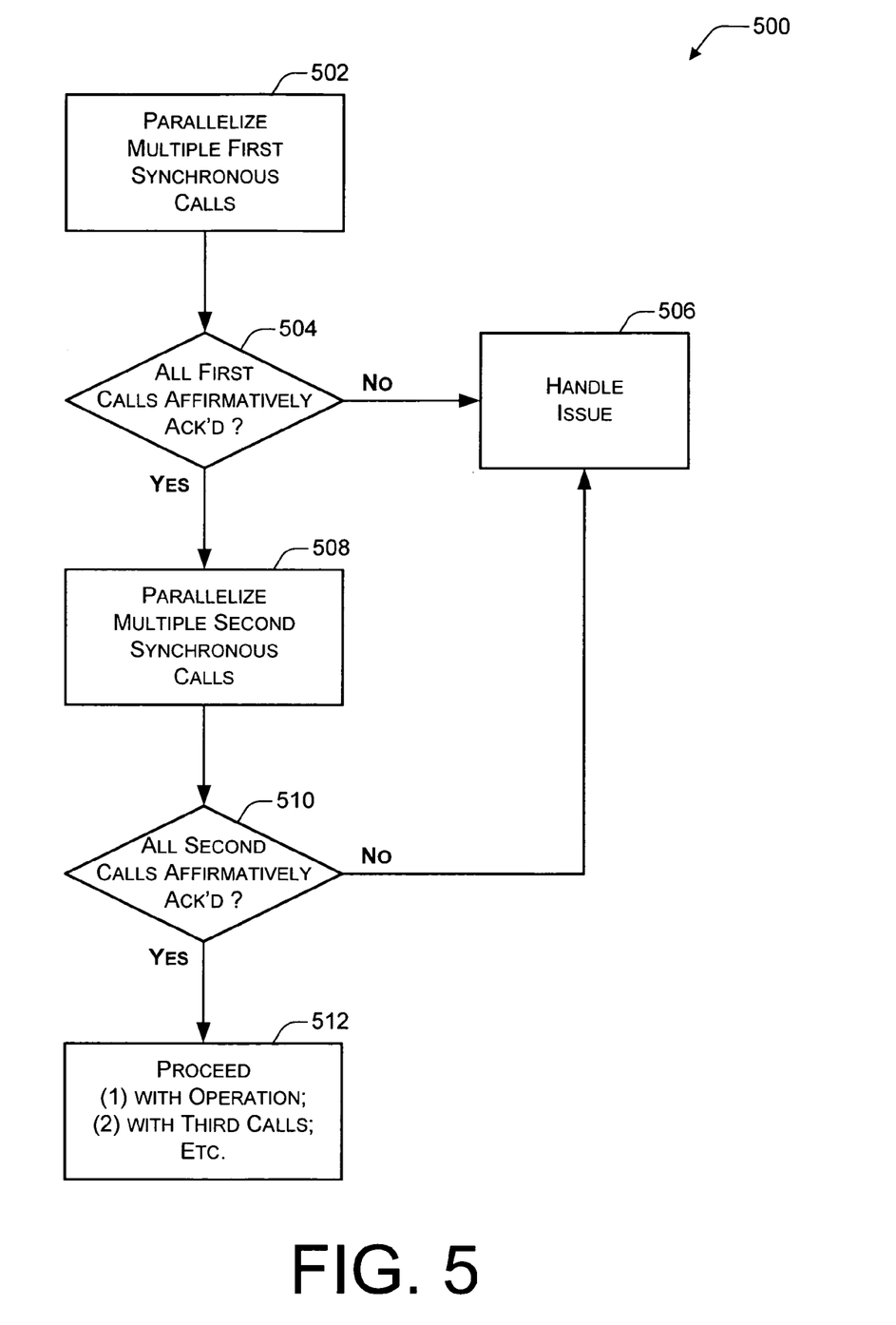
FIG. 5 is a flow diagram that illustrates a second example of a method for hybrid programming.

FIG. 5 is a flow diagram 500 that illustrates a second example of a method for hybrid programming. Flow diagram 500 includes six (6) blocks 502-512. Although the actions of flow diagram 500 may be performed in other environments and with a variety of hardware and software combinations, a device 302 (of FIG. 3) may be used to implement the method of flow diagram 500. Also, the method may be implemented in a distributed processing or networked environment.

At block 502, multiple first synchronous calls are parallelized. For example, a first set of synchronous calls may be sent from an originating peer without waiting for acknowledgments to be received from destination peers for individual ones of the first synchronous calls, thus transforming them into asynchronous calls relative to one another. At block 504, it is determined if all first calls have been affirmatively acknowledged. For example, the originating peer may determine if an affirmative acknowledgment has been received from all destination peers for each synchronous call of the first set of synchronous calls. If not, then the issue is handled at block 506. For example, a communication error handling routine may be called.

If, on the other hand, all of the first calls are determined to have been affirmatively acknowledged (at block 504), then at block 508 multiple second synchronous calls are parallelized. For example, a second set of synchronous calls may be sent from the originating peer without waiting for acknowledgments to be received from the destination peers for individual ones of the second synchronous calls, which enables at least some of the second synchronous calls to be simultaneously under execution. At block 510, it is determined if all second calls have been affirmatively acknowledged. For example, the originating peer may determine if an affirmative acknowledgment has been received from all destination peers for each synchronous call of the second set of synchronous calls. If not, then the issue is handled at block 506.

If, on the other hand, all of the second calls are determined to have been affirmatively acknowledged (at block 510), then at block 512 the program may proceed. For example, the program may proceed with a target operation, with a third phase having multiple third synchronous calls, and so forth. In accordance with the actions of flow diagram 500, multiple synchronous calls are parallelized within a set of such synchronous calls. This effectively transforms them into multiple asynchronous calls from a micro perspective, but they remain synchronized for the set of synchronous calls from a macro perspective.

Figure 6:
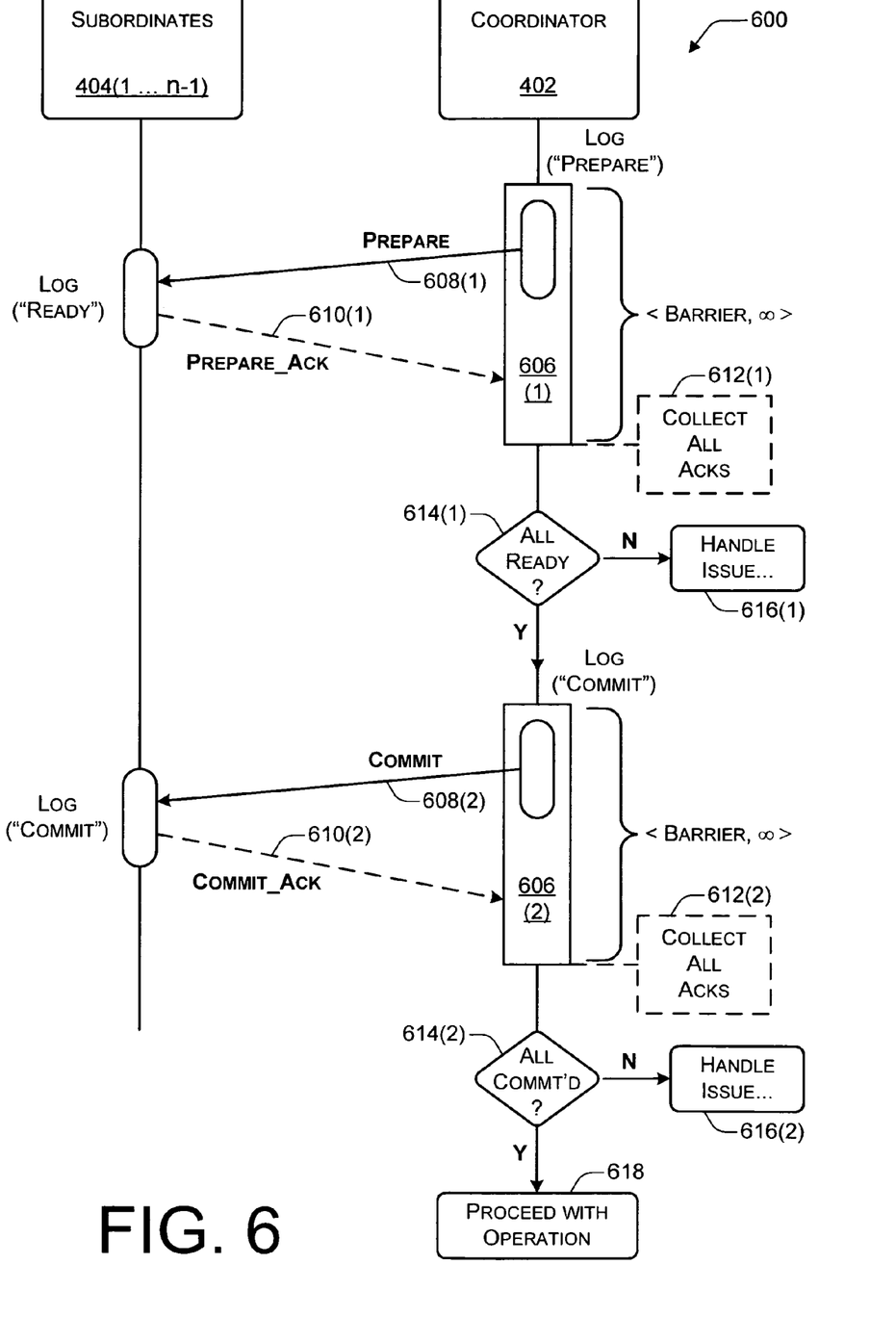
FIG. 6 is a specific example of a hybrid protocol for hybrid programming that is directed to a two-phase commitment procedure.

FIG. 6 is a specific example of a hybrid protocol 600 for hybrid programming that is directed to a two-phase commitment procedure. With reference to FIG. 4, hybrid protocol 400 is directed to multiple-phase and multiple-party communication exchanges. It is also applicable, for example, to distributed programming environments, such as P2P networks. Hybrid protocol 600 (of FIG. 6) is a specific example of the more general hybrid protocol 400 (of FIG. 4). Hybrid protocol 600 is an example of a two phase commitment (2PC) procedure. After the two phases are successfully completed, an operation may be conducted.

Generally, first message 408(1) of hybrid protocol 400 is implemented as a prepare message 608(1) in hybrid protocol 600. Second message 408(2) of hybrid protocol 400 is implemented as a commit message 608(2) in hybrid protocol 600. If all subordinates 404(1 ... n–1) are ready and committed (as determined at blocks 614(1) and 614(2), respectively), coordinator 402 is empowered to proceed with an operation at block 618.

Specifically, coordinator 402 logs the "Prepare" communication exchange and prepares a barrier encapsulation 606(1). In this example, the timeout variable is set to infinity so that coordinator 402 does not progress with the operation unless/until acknowledgments are received from all destination subordinates 404(1 ... n–1).

Prepare messages 608(1) are sent to destination subordinates 404(1 ... n–1) from coordinator 402. In response, subordinates 404(1 ... n–1) log when they are "Ready" (e.g., by changing or setting a state, by locking operations or resources, etc.). Prepare acknowledgment messages 610(1) are sent back to coordinator 402. Coordinator 402 collects the acknowledgments at 612(1). After they have been received from all subordinates 404(1 ... n–1), coordinator 402 determines if all subordinates 404(1 ... n–1) are ready at block 614(1). If not, then coordinator 402 handles the issue at block 616(1).

If, on the other hand, no subordinate 404 failed to indicate readiness in its prepare acknowledgment message 610(1), then coordinator 402 logs the "Commit" communication exchange and establishes barrier 606(2). Commit messages 608(2) are sent to destination subordinates 404(1 ... n–1), and commit acknowledgment messages 610(2) are received from them. Commit acknowledgment messages 610(2) indicate that they are capable or are not capable of accepting commands to perform the operation. The acknowledgements are collected at block 612(2).

If all of the subordinates 404(1 ... n–1) are committed as determined at block 614(2), then coordinator 402 may proceed at block 618 with the operation that is prepped by the 2PC procedure. If they are not all committed, then coordinator 402 handles the issue at block 616(2).

The transformation of the synchronous commands into an encapsulated set of asynchronous commands may be accomplished in a fashion that is transparent to the programmer. The following sample code represents an example communication exchange that comports with a hybrid programming model for a 2PC procedure. The set of synchronous messages are parallelized with the "PAR" command having a "PAR_BEGIN" and a "PAR_END". In the example below, the timeout variable is set to "∞", but a shorter barrier time may alternatively be used.

```
LOG("Prepare");
PAR_BEGIN(∞)
    for_each(p, SubodinateSet) {
        SendMsg(p, PREPARE, AckBuf[p]);
    }
PAR_END
if (all_ready) {
    LOG("Commit");
    PAR_BEGIN(∞)
        for_each(p, SubodinateSet) {
            SendMsg(p, COMMIT, AckBuf[p]);
        }
    PAR_END
}
```

The devices, actions, aspects, features, functions, procedures, modules, data structures, protocols, models, components, etc. of FIGS. 1-6 are illustrated in diagrams that are divided into multiple blocks. However, the order, interconnections, interrelationships, layout, etc. in which FIGS. 1-6 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for hybrid programming.

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. One or more processor-accessible storage media comprising processor-executable instructions that, when executed by a processor of a device, perform acts comprising:

parallelizing, according to a hybrid programming model combining aspects of a thread-oriented programming model with aspects of an event-oriented programming model, multiple first synchronous calls within a first barrier time period in a first phase of development of a software program to produce a graphical user interface description of the software program, wherein the multiple first synchronous calls are executed asynchronously after being parallelized;

parallelizing, according to the hybrid programming model and in response to executing and affirmatively acknowledging each of the multiple first synchronous calls, multiple second synchronous calls within a second barrier time period in a second phase of development of code of the software program to produce skeleton code of the software program, wherein the multiple second synchronous calls are executed asynchronously after being parallelized;

parallelizing, according to the hybrid programming model and in response to executing and affirmatively acknowledging each of the multiple second synchronous calls, multiple third synchronous calls within a third barrier time period in a third phase of development of code of the software program to produce final source code of the software program, wherein the multiple third synchronous calls are executed asynchronously after being parallelized; and compiling the final source code of the software program to produce final executable code of the software program.

2. The one or more processor-accessible storage media as recited in claim 1, wherein the parallelized multiple first synchronous calls comprise multiple first messages that are sent to multiple destinations; and wherein first acknowledgement messages from at least a portion of the multiple destinations are collected during the first barrier time period.

3. The one or more processor-accessible storage media as recited in claim 2, wherein a length of the first barrier time period is set by a timeout variable.

4. The one or more processor-accessible storage media as recited in claim 2, wherein the parallelized multiple second synchronous calls comprise multiple second messages that are to be sent to the multiple destinations; and wherein the processor-executable instructions are adapted to determine if first acknowledgment messages are received from all of the multiple destinations during the first barrier time period; and if the first acknowledgement messages are determined to be received from all of the multiple destinations during the first barrier time period, sending the parallelized multiple second synchronous calls to the multiple destinations.

5. The one or more processor-accessible storage media as recited in claim 4, wherein if the first acknowledgement messages are not determined to be received from all of the multiple destinations during the first barrier time period, investigating a status of destinations that have not sent first acknowledgement messages without sending the parallelized multiple second synchronous calls to the multiple destinations.

6. The one or more processor-accessible storage media as recited in claim 4, wherein second acknowledgement messages from at least a portion of the multiple destinations are collected during the second barrier time period;

and wherein the processor-executable instructions are further adapted to determine if the second acknowledgment messages are received from all of the multiple destinations during the second barrier time period; and if the second acknowledgement messages are determined to be received from all of the multiple destinations during the second barrier time period, performing an operation.

7. The one or more processor-accessible storage media as recited in claim 1, wherein a programming development system parallelizes the first synchronous calls, parallelizes the second synchronous calls, parallelizes the third synchronous calls, or a combination thereof, in a manner that is transparent to a programmer.

8. The one or more processor-accessible storage media as recited in claim 1, wherein a programming development system displays a logical outline of the software program as the graphical user interface description of the software.

9. The one or more processor-accessible storage media as recited in claim 1, wherein the first synchronous calls, the second synchronous calls, the third synchronous calls, or a combination thereof, are executed in a distributed system.

10. A device comprising:
a processor;
storage media, the storage media including an application programming interface (API) executable by the processor to:
transform multiple synchronous messages of multiple phases of development of code of a software program into multiple asynchronous messages that are executed in parallel via a hybrid programming model combining aspects of a thread-oriented programming model with aspects of an event-oriented programming model, wherein the multiple asynchronous messages are to be sent to multiple destination subordinates in a distributed system, and wherein synchronous messages of a subsequent phase of development of the code of the software program are transformed in response to executing and affirmatively acknowledging each asynchronous message of a previous phase of development of the code of the software program.

11. The device as recited in claim 10, wherein a collection of messages, which are received at the device from at least a portion of the multiple destination subordinates, that acknowledge the multiple asynchronous messages ceases upon expiration of a timeout period.

12. The device as recited in claim 11, wherein the API comprises at least two instructions, the at least two instructions including a parallelize begin instruction and a parallelize end instruction.

13. The device as recited in claim 11, wherein the API includes a determination as to if an affirmative acknowledgment has been received from all destination subordinates.

14. The device as recited in claim 11, wherein the API comprises an API for a two-phase commitment (2PC) procedure.

15. A method comprising:
parallelizing, at a computer device executing a hybrid programming model utilizing parallelized calls, multiple first synchronous calls of a first phase of development of code of a software program within a first barrier time period, wherein the multiple first synchronous calls are executed asynchronously after being parallelized;

determining, by the computer device, if all of the parallelized multiple first synchronous calls are affirmatively acknowledged;

if all of the parallelized multiple first synchronous calls are determined to be affirmatively acknowledged, parallelizing, by the computer device, multiple second synchronous calls of a second phase of development of the code of the software program within a first barrier time period, wherein the multiple first synchronous calls are executed asynchronously after being parallelized;

determining, by the computer device, if all of the parallelized multiple second synchronous calls are affirmatively acknowledged; and if all of the parallelized multiple second synchronous calls are determined to be affirmatively acknowledged, parallelizing multiple third synchronous calls of a third phase of development of the code of the software program within a first barrier time period, wherein the multiple first synchronous calls are executed asynchronously after being parallelized.

16. The method as recited in claim 15, further comprising:

if all of the parallelized multiple first synchronous calls are not determined to be affirmatively acknowledged, handling, by the computer device, a first acknowledgment failure; and if all of the parallelized multiple second synchronous calls are not determined to be affirmatively acknowledged, handling, by the computer device, a second acknowledgment failure.

17. The method as recited in claim 15, wherein the first barrier time period is bounded by a timeout period.

18. The method as recited in claim 17, wherein the encapsulating effectively maintains a synchronous nature of the multiple first synchronous calls with respect to development of code of the software program overall.

19. The method as recited in claim 15, wherein:

the parallelizing multiple first synchronous calls comprises parallelizing, by the computer device, multiple prepare messages; and the parallelizing multiple second synchronous calls comprises parallelizing, by the computer device, multiple commit messages.

* * * * *